United States Patent Office 3,246,990
Patented Apr. 19, 1966

3,246,990
METHOD FOR PUFFING A CEREAL PRODUCT
Joseph John Thompson and Charles Albert Doan, Battle Creek, Mich., assignors to Kellogg Company, Battle Creek, Mich., a corporation of Delaware
No Drawing. Filed Nov. 8, 1962, Ser. No. 236,428
6 Claims. (Cl. 99—82)

This invention relates to a puffed food product of the breakfast cereal type and particularly to a novel method for producing the same.

It is a particular object of the present invention to provide a gun puffed cereal product with a high sugar content, such as up to about 25% by weight, of improved eating characteristic, storage stability, and ability to remain crisp when combined with milk for consumption for relatively long periods of time.

The present invention is particularly directed to the incorporation of sugar in a uniform manner throughout the body of the puffed cereal product and which after puffing retains the form or enlarged size to which it is puffed, as distinguished from puffed cereal products which are provided with a coating of sugar after being puffed by means of an aqueous solution and which of necessity causes some reduction in volume of the puffed product.

Heretofore, in the production of gun puffed shaped dough pellets into ready-to-eat cereal products it was not feasible to gun puff the pellets with a content over about 3% of sugar by weight because the pellets stuck together and formed clusters and also adhered to the walls of the gun puffing equipment, resulting in interference with the puffing operation and the character of the end product.

In accordance with the present invention it has been found that gun puffed pellets may be readily produced without becoming agglomerated or without sticking to the puffing equipment and a body of discrete, free-flowing, storage stable particles or pellets can be readily produced which particles have a sugar content of from about 5% to about 25% by weight.

The objects of the present invention are accomplished by incorporating from about 1½% to about 5% by weight of normally solid hydrogenated vegetable oil in molten condition with the cereal dough pellets either by adding the aforesaid vegetable oil to the dough during mixing of the dough components prior to extruding, or to the subsequently extruded and shaped particles prior to gun puffing, or by a combination, that is, incorporating part of the aforesaid amount of hydrogenated vegetable oil in the dough and part of it by spraying onto the shaped particles prior to subjecting them to explosive puffing.

The vegetable oils employed are, as indicated, hydrogenated to a normally solid condition, such hydrogenated oils giving better rancidity protection and retention of freshness of the product for longer periods of time as distinguished from the use of added or contained oils such as wheat germ oil or corn oil which rapidly become rancid on standing. The hydrogenated oils which we employ can be such as hydrogenated coconut oil, hydrogenated corn oil, hydrogenated cotton seed oil, hydrogenated peanut oil, and the like.

In carrying out the process of the present invention, cereal flours such as oat flour, wheat flour, and the like or their mixtures, together with other cereal components such as wheat starch, corn starch, and the like or other mixtures, are combined with additives such as minor amounts of defatted wheat germ, salt, coloring, and sucrose, as appears in detail in the following examples. These are mixed with water to form a dough in a suitable mixing device wherein the dough is cooked with the aid of steam, and then extruded into desired shape and severed into individual pellets of ring-shaped, star-shaped, letter-shaped, or other desired form.

As previously indicated, all or a part of the indicated amount of hydrogenated vegetable oil may be incorporated with this dough during the mixing step. These shaped dough pellets are then dried to desired extent depending on the method of carrying out the explosive puffing, and then sprayed with melted hydrogenated vegetable oil in the event that all or a portion of the desired amount of hydrogenated oil has not been incorporated during the mixing step.

Suitably, drying is also conducted so as to partially heat puff the pellets and to cause them to slightly round out, thereby losing the sharp edges and flat surfaces caused by the use of the conventional cut-off knife during extrusion.

Thus, for example, when puffing by means of a rotary puffing gun, the particles which as extruded have a moisture content of about 30–35%, are dried to a moisture content of about 15%, preheated in the atmosphere at a temperature of about 250° and placed in a rotary puffing gun which is heated externally for several minutes, until pressure builds up to about 130–140 pounds per square inch gauge, and then explosively discharged to a collection chamber at atmosphere pressure.

Alternately, the pellets may be dried to a moisture content of about 10–12% by weight, and shortly before puffing preheated in the atmosphere at a temperature of 250° to a moisture content of about 7–8%, and then placed in a chamber under a superatmospheric steam pressure causing the particles to be conditioned with and permeated by steam at pressure of, for example, about 90 to about 110 pounds per square inch gauge, and then discharged therefrom to a heated zone of sub-atmospheric pressure such as a pressure of about 20 inches mercury, and then recovered therefrom to the atmosphere at a moisture content of about 3% to about 5% by weight. The resulting product is composed of well puffed particles of a crisp, free-flowing, discrete particle which are friable and easy to eat and will retain their crispness in milk for prolonged periods.

The following is a specific example of the present invention for the purpose of illustration and not limitation:

*Example 1*

| | Percent by wt. |
|---|---|
| Oat flour | 31.36 |
| Corn starch | 14.16 |
| Wheat starch | 14.16 |
| White wheat flour | 29.37 |
| Defatted wheat germ | 3.92 |
| Sucrose | 5.00 |
| Salt | 2.00 |
| Color (Food, Drug and Cosmetic Yellows #5 and #6) | 0.03 |

The foregoing materials which are given on a bone dry basis, were mixed with water to give a moisture content of 30% by weight taking into consideration the inherent water content of the flour which is about 8.5%. Thus, 20 pounds of the above flour mixture were fed per minute together with 6.6 pounds of water per minute to a continuous mixer to form a dough having a moisture content of approximately 30%. During mixing steam was added at 25 pounds pressure, bringing the moisture content up to about 32%, the mixing chamber through which the dough was passed being jacketed and heated externally with steam at about 20–35 pounds pressure, to cook the dough during its passage.

After being thoroughly mixed and cooked while passing through this continuous cooker-mixer, the dough was continuously extruded therefrom through a die having suitably shaped apertures, and the extruding strips continuously severed by a rotating knife into particles of desired length, so that there issued pellets of desired shape at a moisture content of about 31%.

These wet pellets were then dried by passing them in a continuous manner through a multi-section, single-flight, forced air oven, and dried therein at an initial temperature of about 400–450° F. with the temperature dropping at the outlet to about 360° in a period of approximately 3 minutes. The issuing pellets had a moisture content of about 10–12% and were slightly puffed and rounded out so that the sharp edges and flat surfaces caused by the cut-off knife at the extruder were lost.

It will be understood that the heating in this drying oven is such as to reduce the particles to desired moisture content, depending upon the subsequent method of puffing, as previously indicated, and the times and temperatures regulated so as to prevent blistering of the pellets. Although in the foregoing example the amount of sugar is 5%, with higher proportions of sugar, say about up to 25%, will appear from the subsequent examples, the initial or first section temperatures in this drying oven are regulated to preferably below 400° F. so as to prevent blistering. These dried pellets were then sprayed with 5% by weight of hydrogenated coconut oil and then permitted to temper over night so as to equalize the moisture content.

Thereafter, the tempered pellets were subjected to gun puffing by preheating them to a temperature of 250° at atmospheric pressure to reduce the moisture content to about 7–8% by weight, and then placed in a chamber with steam at a pressure of 90–110 pounds per square inch gauge to cause them to be conditioned and permeated by the steam, following which they were discharged to a chamber under a vacuum of 20–21 inches mercury, and wherein they were caused to greatly puff and to simultaneously lose moisture so that on discharge to the atmosphere from the vacuum chamber they had a moisture content of 3–5% by weight. The resulting product was of a free-flowing, discrete particle character; that is to say, free from particle agglomerates. No sticking to the walls of the gun puffing chambers and component parts was encountered.

If desired, these discharged particles may be further dried in the atmosphere under heat before packaging to a moisture content of about 2%.

The following are added examples for the purpose of illustration showing the various times at which the hydrogenated vegetable oil can be incorporated and the various proportions of sugar which may be included in the dough from which the pellets are formed prior to puffing:

*Example 2*

| | Percent by wt. |
|---|---|
| Oat flour | 29.67 |
| Corn starch | 13.40 |
| Wheat starch | 13.40 |
| White wheat flour | 27.79 |
| Defatted wheat germ | 3.71 |
| Hydrogenated vegetable oil | 5.00 |
| Sucrose | 5.00 |
| Salt | 2.00 |
| Color | 0.03 |

In the foregoing, all of the vegetable oil was pre-mixed with part of the oat flour before mixing with the rest of the dry ingredients.

*Example 3*

| | Percent by wt. |
|---|---|
| Oat flour | 29.67 |
| Corn starch | 13.40 |
| Wheat starch | 13.40 |
| White wheat flour | 27.79 |
| Defatted wheat germ | 3.71 |
| Sucrose | 10.00 |
| Salt | 2.00 |
| Color | 0.03 |

The pellets made from this formula were sprayed with hydrogenated vegetable oil equal to 5% of the weight of the pellets after drying and before gun puffing.

*Example 4*

| | Percent by wt. |
|---|---|
| Oat flour | 27.98 |
| Corn starch | 12.64 |
| Wheat starch | 12.64 |
| White wheat flour | 26.21 |
| Defatted wheat germ | 3.50 |
| Hydrogenated vegetable oil | 5.00 |
| Sucrose | 10.00 |
| Salt | 2.00 |
| Color | 0.03 |

All of the hydrogenated vegetable oil was pre-mixed with part of the oat flour before mixing with the rest of the dry ingredients.

*Example 5*

| | Percent by wt. |
|---|---|
| Oat flour | 27.98 |
| Corn starch | 12.64 |
| Wheat starch | 12.64 |
| White wheat flour | 26.21 |
| Defatted wheat germ | 3.50 |
| Sucrose | 15.00 |
| Salt | 2.00 |
| Color | 0.03 |

The pellets made from the foregoing formula were sprayed with hydrogenated vegetable oil equal to 5% of the weight of the pellets after drying and before gun puffing.

*Example 6*

| | Percent by wt. |
|---|---|
| Oat flour | 24.61 |
| Corn starch | 11.12 |
| Wheat starch | 11.12 |
| Michigan white wheat flour | 23.05 |
| Defatted wheat germ flour | 3.07 |
| Sucrose | 25.00 |
| Salt | 2.00 |
| Color | 0.03 |

The dried pellets were sprayed with melted hydrogenated coconut oil at a 5% level before gun puffing.

*Example 7*

| | Percent by wt. |
|---|---|
| Oat flour | 23.60 |
| Corn starch | 10.66 |
| Wheat starch | 10.66 |
| Michigan white wheat flour | 22.10 |
| Defatted wheat germ flour | 2.95 |
| Sucrose | 25.00 |
| Melted hydrogenated coconut oil | 3.00 |
| Salt | 2.00 |
| Color | 0.03 |

The 3% of hydrogenated oil in the above formual was incorporated during mixing and the dried pellets were further sprayed before gun puffing with melted hydrogenated coconut oil at a 2% level.

Although in the foregoing examples we have described the use of hydrogenated oils incorporated with and preferably sprayed on the shaped cooked dough particles after drying and before gun puffing, and wherein the particles contain from about 5% to about 25% by weight of sugar, it will be understood that our invention is useful and provides enhanced results even with lower amounts of sugar, although our invention is particularly applicable to the employment of the higher amounts of sugar hitherto thought not feasible for incorporation prior to gun puffing, this breakthrough being possibly the result of some as yet unexplained synergistic effect.

Although we have described the preferred embodiments

We claim:

1. The method of making a puffed food product of the breakfast cereal type which comprises explosively puffing particles of cereal dough containing from about 5% to about 25% by weight of sugar after adding to said particles from about 1½% to about 5% by weight of solid hydrogenated vegetable oil.

2. The method of claim 1 wherein the hydrogenated vegetable oil is added to the dough by spraying the dough particles therewith in molten condition.

3. The method of claim 1 wherein the hydrogenated vegetable oil is added to the dough by incorporating it therein by kneading.

4. The method of claim 1 wherein a part of the hydrogenated vegetable oil is added to the dough by incorporating it therein by kneading and in part by spraying on the dough particles in molten condition.

5. The method of making a puffed food product of the breakfast cereal type which comprises heating cooked cereal dough pellets containing from about 5% to about 25% by weight of sugar to dry and slightly puff them, spraying said dried pellets with and incorporating thereby from about 1½% to about 5% by weight of molten solid hydrogenated vegetable oil, tempering the sprayed particles, and then subjecting them to explosive puffing.

6. The method of making an explosively puffed food product of the breakfast cereal type which comprises adding to cooked cereal dough pellets from about 5% to about 25% by weight of sugar, incorporating with said pellets from about 1½% to about 5% by weight thereof molten solid hydrogenated vegetable oil, and then subjecting them to said explosive puffing.

References Cited by the Examiner

UNITED STATES PATENTS

| | | | |
|---|---|---|---|
| 2,162,376 | 6/1939 | Collatz | 99—82 |
| 2,188,180 | 1/1940 | Felt et al. | 99—82 |
| 2,339,419 | 1/1944 | McKay | 99—81 |
| 2,388,904 | 11/1945 | Collatz | 99—82 |
| 2,653,098 | 9/1953 | Baer | 99—82 |
| 2,915,957 | 12/1959 | Bowman | 99—82 |

A. LOUIS WINKELSTEIN, *Primary Examiner.*

ABRAHAM H. WINKELSTEIN, RAYMOND N. JONES, *Examiners.*